United States Patent Office 2,852,916
Patented Sept. 23, 1958

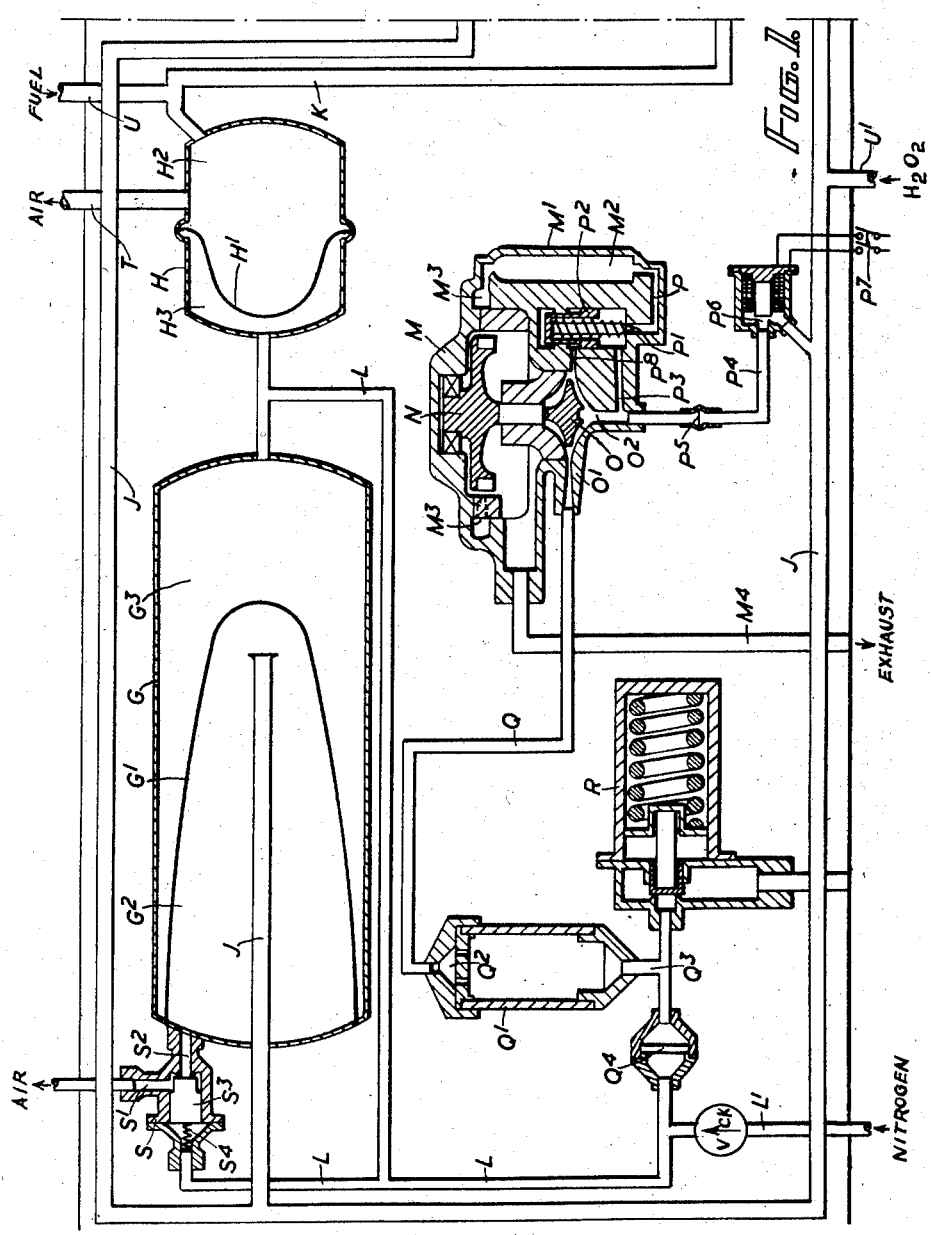

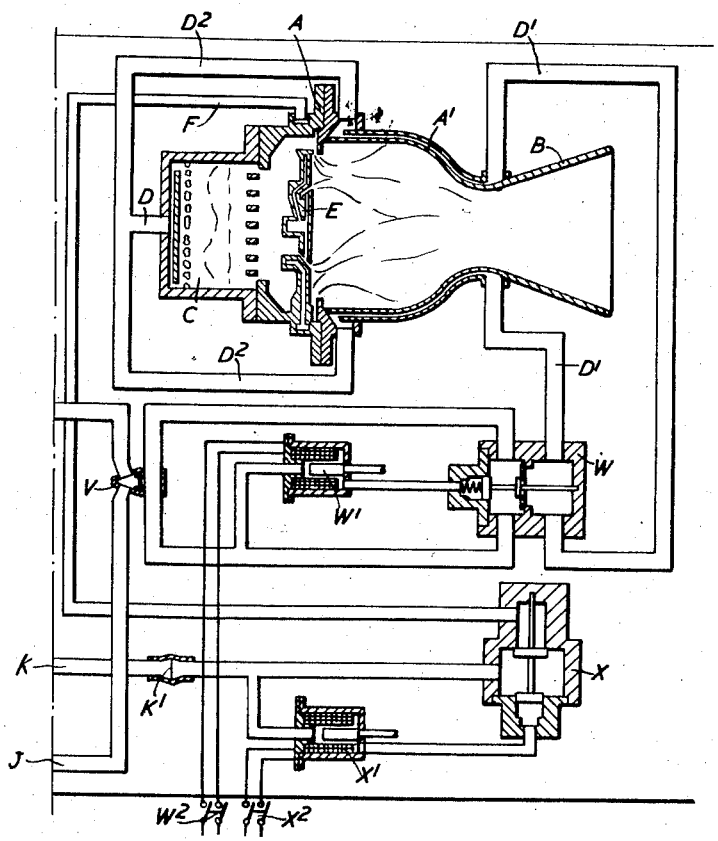
FIG. IIA.

2,852,916

GAS PRODUCING APPARATUS ESPECIALLY FOR ROCKET TYPE PROPULSION DEVICES

Francis John Hearn and Walter Shirley, Luton, England, assignors to D. Napier & Son Limited, London, England, a British company Application May 13, 1955, Serial No. 508,235

Claims priority, application Great Britain May 25, 1954

11 Claims. (Cl. 60—39.48)

This invention relates to power gas producing apparatus and is concerned with the expulsion of reaction or decomposition fluids from reservoirs in power-gas producing apparatus such, for example, as rocket type propulsion devices of the kind in which one or more reaction or decomposition fluids are contained in a reservoir or reservoirs from which, during operation of the apparatus, the fluid is expelled into a main reaction or decomposition chamber by gas pressure (hereinafter called expulsion gas pressure) supplied to the reaction or decomposition fluid or fluids in the reservoir or each reservoir either directly or through a movable or deformable wall, for example in the form of a diaphragm or "bag" dividing the reservoir into a reaction or decomposition fluid chamber and an expulsion gas chamber.

The term "reaction fluid" used herein is used to mean one of two or more fluids which react upon one another in the main reaction chamber to produce the power gas, while the term "decomposition fluid" is used to mean a fluid which can be caused to decompose, for example by a catalyst, or by subjecting it to a sufficiently high temperature, to produce gaseous products of decomposition, one of the reaction fluids in apparatus of the kind referred to employing reaction fluids also in some cases constituting a decomposition fluid which can be decomposed to form gaseous products and which does so decompose during the reaction in a main reaction chamber.

In power gas producing apparatus of the kind referred to as hitherto proposed, the apparatus includes a container for compressed gas, which may be in liquid form, for example compressed nitrogen, from which, throughout the normal operation of the apparatus, gas is delivered under pressure to the reservoir or reservoirs containing the reaction or decomposition fluid or fluids so as to expel such fluid or fluids at the required pressure or pressures to the main reaction or decomposition chamber. This entails the provision of a comparatively bulky and heavy container or "bottle" for the compressed gas, which is frequently undesirable, especially for example in the case of rocket propulsion apparatus for aircraft or missiles where it is important to keep the weight and bulk of the propulsion apparatus as a whole as small as possible.

Power gas producing apparatus of the kind referred to according to the present invention includes a subsidiary reaction or decomposition chamber arranged to receive reaction or decomposition fluid from at least one reservoir at a relatively low volumetric rate of flow and arranged for the initiation of reaction or decomposition therein, a turbine arranged to be driven by gaseous products of reaction or decomposition from such subsidiary reaction or decomposition chamber, and pumping means arranged to be driven by the turbine and to deliver reaction or decomposition fluid to a reaction or decomposition chamber from which products of reaction or decomposition pass to the reservoir or reservoirs to expel the reaction or decomposition fluid or fluids therefrom into the main reaction or decomposition chamber.

In one convenient arrangement according to the invention two subsidiary reaction or decomposition chambers are provided from one of which the products of reaction or decomposition pass to the turbine only while the pump means delivers reaction or decomposition fluid to the other, products of reaction or decomposition from which pass to the reservoir or reservoirs.

For convenience herein the subsidiary reaction or decomposition chamber from which the products of reaction or decomposition pass to the turbine will be referred to as the first subsidiary reaction chamber, whether there is a second reaction or decomposition chamber or not while where there are two subsidiary reaction or decomposition chambers from one of which products of reaction or decomposition pass only to the reservoir or reservoirs that reaction or decomposition chamber will be referred to as the second reaction chamber.

Preferably means responsive to the pressure rise across the pumping means are provided for controlling the rate of delivery of reaction or decomposition fluid to the first subsidiary reaction or decomposition chamber and thereby the speed of the pump in such a manner that the pump always maintains approximately the same pressure rise. The apparatus also preferably includes means for initially closing the passage or passages by which the products of reaction or decomposition flow to the reservoir or reservoirs and means by which an initial fluid pressure can be delivered from an external source to the reservoir or reservoirs to provide sufficient pressure to initiate the feed of reaction or decomposition fluid to the first subsidiary reaction chamber until the pumping means is in effective operation, the arrangement being such that, when the reaction or decomposition has started the means initially closing the passage or passages by which products of reaction or decomposition flow to the reservoir or reservoirs are rendered ineffective by pressure derived from such reaction or decomposition.

Conveniently the means for initially closing the passage by which the products of reaction flow to the second subsidiary reaction or decomposition chamber the reservoir or reservoirs is in the form of a breakable sealing disc or the like which will remain intact under the pressure delivered from the external source to provide initial delivery of reaction or decomposition fluid to the first subsidiary reaction or decomposition chamber, but will break when subjected to an appropriate opposite pressure from the products of reaction.

Further, a safety blow-off valve may be provided communicating with the reaction or decomposition chamber from which products of reaction flow to the reservoir or reservoirs and arranged to open at a predetermined pressure in excess of that required to break the sealing disc, or otherwise render ineffective the means initially closing the passage through which the products of reaction flow to the reservoir or reservoirs and this blow-off valve may serve to determine the working pressure maintained in the reservoir or reservoirs.

Where, as may often be the case, the invention is applied to apparatus including a main reaction chamber in which reaction between two reaction fluids takes place during normal operation, one of such fluids being a hydrocarbon or like fuel while the other is an oxygen-bearing fluid such as hydrogen peroxide which is itself capable of decomposition by catalytic action, by a suitable catalyst such as silver, only the reaction fluid capable of being itself decomposed is conveniently employed in the first and second subsidiary chambers which thus constitute decomposition chambers in which chambers such decomposition is caused to take place to provide the fluid respectively for operating the turbine and for supplying expulsion fluid under pressure to the reservoirs.

Thus in a convenient arrangement of this kind according to the invention each auxiliary decomposition chamber is provided with a catalytic element over or through which the hydrogen peroxide or the like is arranged to pass so as to be decomposed into gaseous products.

One arrangement according to the invention is shown diagrammatically by way of example in the accompanying drawing, which for convenience is split into two parts numbered respectively Figure 1 and Figure 1a.

In the arrangement shown in the drawing the apparatus comprises a main reaction and nozzle assembly comprising a main reaction chamber A one end of which communicates directly with a propulsion nozzle B while its other end contains a catalytic element or bed C of a kind which will decompose hydrogen peroxide into oxygen and steam, that is to say in the form, for example, of a stack of silver coated gauzes. A main hydrogen peroxide supply pipe D leads as shown into the end of the main reaction chamber A containing the catalytic bed C.

Disposed at an intermedaite point in the length of the main reaction chamber A is a fuel distributing element E arranged so that the products of decomposition of the hydrogen peroxide will pass through it and have fuel (assumed to be kerosene) delivered into them so as to burn with the oxygen and thus provide gaseous products of reaction which are ejected through the nozzle B with propulsive effect.

Fuel is delivered to the fuel distributing element E by a fuel supply pipe F.

As will be seen, the part of the wall of the main reaction chamber A between the fuel distributing element E and the nozzle B is formed hollow so as to provide a jacket space as shown at $A^1$ and the hydrogen peroxide to be delivered to the supply pipe D flows from twin pipes $D^1$ to the rear end of the jacket space $A^1$ and through this space so as to cool the wall of the reaction chamber A, before entering twin pipes $D^2$ leading to the supply pipe D.

The apparatus for supplying the hydrogen peroxide and the fuel respectively to the supply pipes $D^1$ and E comprises a hydrogen peroxide reservoir G and a fuel reservoir H, each of these reservoirs being divided in known manner by a flexible diaphragm $G^1$, $H^1$ into two chambers $G^2$, $G^3$, and $H^2$, $H^3$ of which the chambers $G^2$ and $H^2$ communicate respectively with main hydrogen peroxide and fuel delivery pipes J and K while the chambers $G^3$ and $H^3$ communicate with an expulsion fluid supply pipe L by which expulsion gas to expel the hydrogen peroxide and fuel can be supplied to the chambers $G^3$ and $H^3$.

The means for supplying the expulsion gas for expulsion of the hydrogen peroxide and fuel from the reservoirs G and H comprises a turbine unit shown generally at M and comprising a first subsidiary reaction chamber $M^1$ containing a catalytic bed $M^2$ suitable for decomposing hydrogen peroxide into oxygen and steam while its other end communicates with the nozzle ring $M^3$ of a turbine having a rotor N which is coupled to the rotor O of a centrifugal pump $O^1$. The turbine is provided with an exhaust passage $M^4$ leading to atmosphere.

Leading into the end of the first subsidiary reaction chamber $M^1$ containing the catalytic bed $M^2$ is a supply passage P controlled by a valve $P^1$ carried by a differential piston $P^2$ the lower face of which is subject to pressure in a delivery passage $P^3$ leading also to the inlet $O^2$ of the pump $O^1$ while its other, and smaller, face is arranged to be subject through a passage $P^8$ to the static pressure of fluid at the outside diameter of the pump $O^1$. The inlet $O^2$ of the pump and the delivery passage $P^3$ both communicate with a supply passage $P^4$ having therein a breakable disc $P^5$ and arranged to receive hydrogen peroxide from the reservoir G through the pipe J via a solenoid actuated valve $P^6$ controlled by a switch $P^7$.

The pump $O^1$ is arranged to deliver hydrogen peroxide through a pipe Q to one end of a second subsidiary reaction chamber $Q^1$ containing a catalytic bed $Q^2$ suitable for the decomposition of hydrogen peroxide into oxygen and steam and communicating at its other end with a pipe $Q^3$ which in turn is initially separated from the pipe L only by a breakable disc $Q^4$ so that on the occurrence of a sufficient pressure difference across the breakable disc it will burst and the passage $Q^3$ and L will communicate directly with one another.

The passage $Q^3$ also communicates with the pressure side of a safety valve device R arranged to open should the pressure in the passage $Q^3$ exceed some predetermined value substantially higher than the bursting pressure of the disc $Q^4$, and thus serves to maintain the working pressure in the passage $Q^3$ or L and in the chambers $G^3$ and $H^3$ of the reservoirs at such predetermined value during normal operation.

To facilitate charging of the reservoir G through the pipe J a vent valve S is provided having an outlet $S^1$ and an inlet $S^2$ controlled by a piston valve $S^3$ which can be lifted during charging against the action of a spring $S^4$ to permit escape of air and serves to indicate when charging is complete by the appearance of liquid at $S^1$. During operation of the apparatus the valve $S^3$ will be held sealed by reason of the fact that its outer face, as shown, is subject to the pressure in the passage L. Communicating with the passage L is a pressurising connection $L^1$ of known type having a non return valve (not shown) at its end which is arranged in known manner for connection to a source of gas pressure, for example nitrogen, for the purpose of providing an initial pressurisation of the chambers $G^3$ and $H^3$.

A fuel filling passage U is provided by which the reservoir H can be filled, air being permitted to escape through a closable vent T while a filling connection $U^1$ is provided by which hydrogen peroxide can be delivered to the reservoir G through the pipe J.

The passage J which as shown has twin branches is arranged to deliver hydrogen peroxide to the passage $D^1$ by way of a breakable disc device V and a valve W which is arranged so that it is initially held closed by a fluid pressure but will open when a solenoid operated pilot valve device $W^1$ is energised by the independent closing of a switch $W^2$. Similarly the passage K contains a breakable disc $K^1$ and the supply of fuel therefrom to the passage F after bursting of this disc is controlled by a valve X which is initially held closed by fluid pressure but is arranged to open when a solenoid operated pilot valve device $X^1$ is actuated by the independent closing of a switch $X^2$.

The operation of the apparatus is as follows:

The valve $P^6$ is opened by closing the switch $P^7$ and means for delivering an initial supply of nitrogen under pressure are attached to the connection $L^1$ so as to pressurise the chambers $G^3$ and $H^3$ relatively lightly, whereupon after bursting of the disc $P^5$, hydrogen peroxide flows through the passage $P^4$ to the catalytic bed $M^2$ by which it is decomposed into oxygen and steam and thus passes through the nozzle ring $M^3$ and serves as the working fluid for the turbine M, before passing away to the atmosphere through the passage $M^4$. The turbine rotor N is thus caused to rotate and drive the rotor O of the pump $O^1$ which therefore delivers hydrogen peroxide under pressure from the passage $P^4$ through the passage Q to the reaction chamber $Q^2$. The hydrogen peroxide thus delivered is decomposed by the catalytic bed $Q^2$ into oxygen and steam. The piston $P^2$ of the valve $P^1$ is arranged, as mentioned, so that its upper and lower faces are subject respectively to the static pressure in the outside diameter of the pump casing and the inlet pressure of the pump and it will be seen that as the pressure rise across the pump increases this will tend to close the valve $P^1$. Thus, during operation, the valve $P^1$ tends to control the supply of hydrogen peroxide to the first subsidiary reaction chamber M¹ in a manner such as to maintain turbine speed such as to provide a substantially constant pump pressure rise.

The pressure in the second subsidiary reaction chamber Q¹ therefore now builds up until the disc Q⁴ bursts, whereupon the products of decomposition from the chamber Q¹ pass into the passage L and thus serve thereafter as the expulsion gas to pressurise fully the chambers G³ and H³.

This full pressurisation of the chambers G³ and H³ causes bursting of the discs V and K¹ whereupon the switches W² and X² are closed so as to cause opening first of the valve W to permit hydrogen peroxide to flow through the passage D¹, packet space A¹, passages D² and passage D into the main reaction chamber A by way of the catalytic bed C in which it is decomposed, and then opening of the valve X to permit fuel to flow from the passage K through the passage F to the fuel distributing element E to bring the propulsion apparatus into full operation.

While the bringing into operation of the apparatus has been described above as including the steps of closing the switches P⁷, W² and X² in succession, the switches might all be closed at once when the apparatus is to be brought into operation, the breakable discs V and K¹ being designed to fracture at appropriate pressures to initiate the supply of hydrogen peroxide and fuel to the main reaction chamber A at the appropriate moments and in correct sequence.

It will be apparent that with the apparatus according to the invention described above, no compressed air bottle or like source of compressed gas has to be provided as part of the apparatus itself to expel the hydrogen peroxide and the fuel from their respective reservoirs during normal operation, all that is necessary being an initial external supply of pressurised gas to cause the initial delivery of hydrogen peroxide to the first subsidiary reaction chamber M¹.

What we claim as our invention and desire to secure by Letters Patent is:

1. Power gas producing apparatus of the kind referred to including a main reaction or decomposition chamber, a subsidiary reaction or decomposition chamber connected to receive reaction or decomposition fluid from at least one reservoir at a relatively low volumetric rate of flow and having means for the initiation of reaction or decomposition therein, a turbine driven by gaseous products of reaction or decomposition from said subsidiary reaction or decomposition chamber, and pumping means driven by the turbine and connected to deliver reaction or decomposition fluid from said reservoir to a secondary subsidiary reaction or decomposition chamber, and means for delivering products of reaction or decomposition from said last mentioned chamber to the reservoir or reservoirs to expel the reaction or decomposition fluid or fluids therefrom into the main reaction or decomposition chamber.

2. Power gas producing apparatus as claimed in claim 1 including means responsive to the pressure rise across the pumping means and controlling the rate of delivery of reaction or decomposition fluid to said turbine to maintain an approximately constant pressure rise across the said pumping means.

3. Power gas producing apparatus as claimed in claim 1 including means for initially closing communication between the second subsidiary reaction or decomposition chamber and the reservoir or reservoirs, and means by which an initial fluid pressure can be delivered from an external source to the reservoir or reservoirs to initiate the feed of reaction or decomposition fluid to the first subsidiary reaction or decomposition chamber, the arrangement being such that when reaction has started in the said second subsidiary reaction or decomposition chamber the pressure thus applied to the means initially closing communication between this second subsidiary reaction or decomposition chamber and the reservoir or reservoirs renders such means ineffective.

4. Power gas producing apparatus of the kind referred to comprising a main reaction chamber, to which lead delivery passages respectively for an oxygen-bearing fluid and a fuel, a catalytic bed for decomposition of the oxygen-bearing fluid situated so that such fluid will pass therethrough and be decomposed thereby, and the products of decomposition will pass into the reaction chamber, fuel distributing means connected to receive fuel from the fuel delivery passage and distribute it in the products of decomposition passing from the catalytic bed, and means for delivering oxygen-bearing fluid and fuel to the said delivery passages comprising reservoirs for the oxygen-bearing fluid and the fuel and having means for the expulsion of fluid therefrom to the delivery passages by expulsion gas pressure, and means for supplying such expulsion gas pressure including a subsidiary decomposition chamber containing a catalytic bed and connected to receive oxygen-bearing fluid from the appropriate reservoir, a turbine connected to be driven by the products of decomposition from such subsidiary decomposition chamber and a pump driven by the turbine and the inlet of which is connected to the reservoir for the oxygen-bearing fluid while its outlet is connected through a third decomposition chamber containing a catalytic bed to the reservoir whereby gaseous products of decomposition of the fluid delivered by the pump to said third chamber serve as the expulsion gas for expulsion of fluids from the reservoirs.

5. Power gas producing apparatus of the kind referred to comprising a main reaction chamber, to which lead delivery passages respectively for an oxygen bearing fluid and a fuel, a catalytic bed for decomposition of the oxygen bearing fluid situated so that such fluid will pass therethrough and be decomposed thereby, fuel distributing means connected to receive fuel from the fuel delivery passage and distribute it in the products of reaction passing from the catalytic bed, and means for delivering the oxygen bearing fluid and the fuel to the said delivery passages comprising reservoirs for the oxygen bearing fluid and the fuel having means for the expulsion of fluid therefrom to the delivery passages by expulsion gas pressure, and means for supplying such expulsion gas pressure including a first decomposition chamber containing a catalytic bed and connected to receive oxygen-bearing fluid from the appropriate reservoir, a turbine connected to be driven by the products of decomposition from said first decomposition chamber and to drive a pump the inlet of which is connected to the reservoir for the oxygen bearing fluid while its outlet is connected to a second subsidiary decomposition chamber containing a catalytic bed, and an expulsion gas passage leading from said second decomposition chamber to the reservoirs whereby the products of decomposition from said second subsidiary decomposition chamber serve as the expulsion gas for expulsion of fluids from the reservoirs.

6. Power gas producing apparatus as claimed in claim 5 including separating means closing the passages through which expulsion gas is delivered to the reservoirs until the pressure of said gas exceeds a predetermined value.

7. Power gas producing apparatus as claimed in claim 6 including connecting means by which the reservoir for the oxygen-bearing fluid can be initially connected to an external source of gas pressure to provide the pressure required for initial delivery of oxygen-bearing fluid.

8. Power gas producing apparatus as claimed in claim 7 including separating means which close the delivery passages leading from the reservoirs to the main reaction chamber until predetermined pressures have been built up in the reservoirs by the supply thereto of the products of decomposition.

9. Power gas producing apparatus as claimed in claim 4 including connecting means by which the reservoir for the oxygen-bearing fluid can be initially connected to an external source of gas pressure to provide the pressure required for initial delivery of oxygen-bearing fluid.

10. Power gas producing apparatus as claimed in claim 9 including separating means which close the delivery passage leading from the reservoirs to the main reaction chamber until predetermined pressures have been built up in the reservoirs by the supply thereto of the products of decomposition.

11. Power gas producing apparatus as claimed in claim 4 including a control valve controlling the rate of delivery of oxygen-bearing fluid to the turbine and to be controlled in accordance with the pressure rise across the pump in such manner as to tend to maintain a substantially constant pressure on the delivery side of the pump.

References Cited in the file of this patent
UNITED STATES PATENTS

| | | |
|---|---|---|
| 2,402,826 | Lubbock | June 25, 1946 |
| 2,573,471 | Malina et al. | Oct. 30, 1951 |
| 2,668,415 | Lawrence | Feb. 9, 1954 |
| 2,671,312 | Roy | Mar. 9, 1954 |
| 2,694,290 | Best | Nov. 16, 1954 |
| 2,697,482 | Blizard | Dec. 21, 1954 |
| 2,701,441 | Mitchell | Feb. 8, 1955 |
| 2,763,126 | Halford et al. | Sept. 18, 1956 |
| 2,785,532 | Kretschmer | Mar. 19, 1957 |

OTHER REFERENCES

"Rocket Motor Oxidants," pages 78, 79, Engineering, Jan. 21, 1955.